United States Patent
Zhang et al.

(10) Patent No.: US 12,501,495 B2
(45) Date of Patent: *Dec. 16, 2025

(54) GENERATING RANDOM ACCESS SIGNALS WITH BEARER INFORMATION

(71) Applicant: ZTE Corporation, Shenzhen (CN)

(72) Inventors: Junfeng Zhang, Shenzhen (CN); Peng Hao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 196 days.

This patent is subject to a terminal disclaimer.

(21) Appl. No.: 18/483,623

(22) Filed: Oct. 10, 2023

(65) Prior Publication Data

US 2024/0040633 A1 Feb. 1, 2024

Related U.S. Application Data

(63) Continuation of application No. 17/239,958, filed on Apr. 26, 2021, now Pat. No. 11,825,524, which is a
(Continued)

(51) Int. Cl.
*H04W 74/0833* (2024.01)
*H04W 74/00* (2009.01)
(Continued)

(52) U.S. Cl.
CPC ..... *H04W 74/0841* (2013.01); *H04W 74/002* (2013.01); *H04W 74/0833* (2013.01);
(Continued)

(58) Field of Classification Search
CPC ........... H04W 74/008; H04W 74/0833; H04W 74/0841; H04W 76/11
See application file for complete search history.

(56) References Cited

U.S. PATENT DOCUMENTS 11,825,524 B2 * 11/2023 Zhang ................... H04W 76/11
2008/0194259 A1 8/2008 Vujcic et al.
(Continued)

FOREIGN PATENT DOCUMENTS

CN 104380826 A 2/2015
CN 107432037 A 12/2017
(Continued)

OTHER PUBLICATIONS

International Search Report and written Opinion regarding PCT/CN2018/115390 dated Aug. 19, 2019, 6 pages.
(Continued)

*Primary Examiner* — Kashif Siddiqui
(74) *Attorney, Agent, or Firm* — Crowell & Moring LLP

(57) ABSTRACT

Methods, systems, and devices for generating random access signals with bearer information are described. An exemplary method for wireless communication includes transmitting, by a terminal to a network node, a first message comprising a first preamble sequence associated with a first index that is from a first half of a set of indexes, and transmitting a second message comprising a second preamble sequence associated with a second index that is from a second half of the set of indexes, wherein the first index and the second index satisfy a constraint relationship.

19 Claims, 5 Drawing Sheets

Related U.S. Application Data continuation of application No. PCT/CN2018/115390, filed on Nov. 14, 2018.

(51) Int. Cl.
    *H04W 74/0836*      (2024.01)
    *H04W 74/0838*      (2024.01)
    *H04W 76/11*      (2018.01)

(52) U.S. Cl.
    CPC ........ *H04W 76/11* (2018.02); *H04W 74/0836* (2024.01); *H04W 74/0838* (2024.01)

(56) References Cited

U.S. PATENT DOCUMENTS

| | | | |
|---|---|---|---|
| 2015/0016312 A1* | 1/2015 | Li | H04L 5/14 370/280 |
| 2015/0078264 A1 | 3/2015 | Han et al. | |
| 2017/0019932 A1 | 1/2017 | Su et al. | |
| 2018/0007590 A1 | 1/2018 | Karout et al. | |
| 2018/0035470 A1 | 2/2018 | Chen et al. | |
| 2020/0329506 A1* | 10/2020 | Liu | H04W 4/70 |
| 2021/0014902 A1* | 1/2021 | Guo | H04W 76/27 |
| 2021/0084687 A1* | 3/2021 | Liu | H04L 5/00 |
| 2021/0126692 A1* | 4/2021 | Chung | H04B 7/0626 |
| 2021/0153189 A1* | 5/2021 | Jo | H04W 72/0453 |
| 2021/0266987 A1* | 8/2021 | Zhang | H04W 74/0833 |

FOREIGN PATENT DOCUMENTS

| | | |
|---|---|---|
| CN | 108476480 A | 8/2018 |
| CN | 108811110 A | 11/2018 |
| JP | 2013255099 A | 12/2023 |
| KR | 1020160030252 A | 3/2016 |
| WO | WO2018175705 A1 | 9/2018 |

OTHER PUBLICATIONS

Huawei et al., "Initial Access in NR Unlicensed," 3GPP TSG RAN WG1 Meeting #95, R1-1812195, Nov. 3, 2018, sections 3-5, 10 pages.

Qualcomm Incorporated, "Remaining details on RACH procedure," 3GPP TSG-RAN WG1 Meeting, RAN1 92, R1-1802814, Mar. 2, 2018, 13 pages.

Extended European Search Report regarding EP18930459 dated Nov. 11, 2021.

Interdigital Inc., "Multiple Msg1 transmissions for one monitored RAR Window," 3GPP Draft; RI-1708992, 3rd Generation Partnership Project (3gpp), Mobile Competence Centre, 650, Route Des Lucioles, F-06921 Sophia-Antipolis Cedex, France, vol. RAN WG1, No. 89, Hangzhou, P.R. China, May 15, 2017-May 19, 2017, May 6, 2017, Retrieved from the Internet: http://www.3gpp.org/ftp/tsg ran/WGI RL 1/TSGRI 89/Docs/.

First Chinese Office Action with English translation regarding 201880099547.8 dated Jul. 1, 2022, 18 pages.

Indian Office Action regarding 202117020807 dated Sep. 19, 2022, 7 pages.

Korean-language Notice of Allowance with concise translation regarding Application No. 10-2021-7014156 dated Feb. 25, 2025 (10 pages).

Chinese-language Search Report issued in Application No. 202310306564.7 dated May 24, 2025 with English translation (20 pages).

* cited by examiner

500

```
┌─────────────────────────────────────────────────────┐
│ Transmitting, by a terminal to a network node, a    │
│ first message comprising a first preamble sequence  │── 510
│ associated with a first index that is from a first  │
│ half of a set of indexes                            │
└─────────────────────────────────────────────────────┘
                           │
┌─────────────────────────────────────────────────────┐
│ Transmitting a second message comprising a second   │
│ preamble sequence associated with a second index    │
│ that is from a second half of the set of indexes,   │── 520
│ wherein the first index and the second index        │
│ satisfy a constraint relationship                   │
└─────────────────────────────────────────────────────┘
```

```
┌─────────────────────────────────────────────────────┐
│ Receiving, by a network node from a terminal, a     │
│ first message comprising a first preamble sequence  │── 610
│ associated with a first index that is from a first  │
│ half of a set of indexes                            │
└─────────────────────────────────────────────────────┘
                           │
┌─────────────────────────────────────────────────────┐
│ Receiving a second message comprising a second      │
│ preamble sequence associated with a second index    │
│ that is from a second half of the set of indexes,   │── 620
│ wherein the first index and the second index        │
│ satisfy a constraint relationship                   │
└─────────────────────────────────────────────────────┘
```

FIG. 6

GENERATING RANDOM ACCESS SIGNALS WITH BEARER INFORMATION

CROSS-REFERENCE TO RELATED APPLICATION

This application is a continuation application of U.S. patent application Ser. No. 17/239,958, filed on Apr. 26, 2021, which is herein incorporated by reference in its entirety. U.S. patent application Ser. No. 17/239,958 is a continuation application of PCT International Patent Application No. PCT/CN2018/115390, filed with the China National Intellectual Property Administration, PRC on Nov. 14, 2018, which is herein incorporated by reference in its entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, thereby requiring more efficient messaging and signaling mechanisms.

SUMMARY

This document relates to methods, systems, and devices for generating random access signals with bearer information in mobile communication systems, e.g., Fifth Generation (5G) and New Radio (NR) systems.

In one exemplary aspect, a wireless communication method is disclosed. The method includes transmitting, by a terminal to a network node, a first message comprising a first preamble sequence associated with a first index that is from a first half of a set of indexes, and transmitting a second message comprising a second preamble sequence associated with a second index that is from a second half of the set of indexes, wherein the first index and the second index satisfy a constraint relationship.

In another exemplary aspect, a wireless communication method is disclosed. The method includes receiving, by a network node from a terminal, a first message comprising a first preamble sequence associated with a first index that is from a first half of a set of indexes, and receiving a second message comprising a second preamble sequence associated with a second index that is from a second half of the set of indexes, wherein the first index and the second index satisfy a constraint relationship.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 5 shows a flowchart of an exemplary wireless communication method.

FIG. 6 shows a flowchart of another exemplary wireless communication method.

DETAILED DESCRIPTION

Emerging mobile communication systems, e.g. Fifth Generation (5G) and New Radio (NR), use constant amplitude zero auto-correlation (CAZAC) sequences (e.g., Zadoff-Chu (ZC) sequences) to generate a random access signals (which are referred to as Msg1 in the present document). These random access signals can be detected by a base station (or gNB, or network node) in addition to a random access preamble index. The base station may then send a random access response to the UE (or terminal, or mobile device) to continue to random access protocol.

Figure 1:
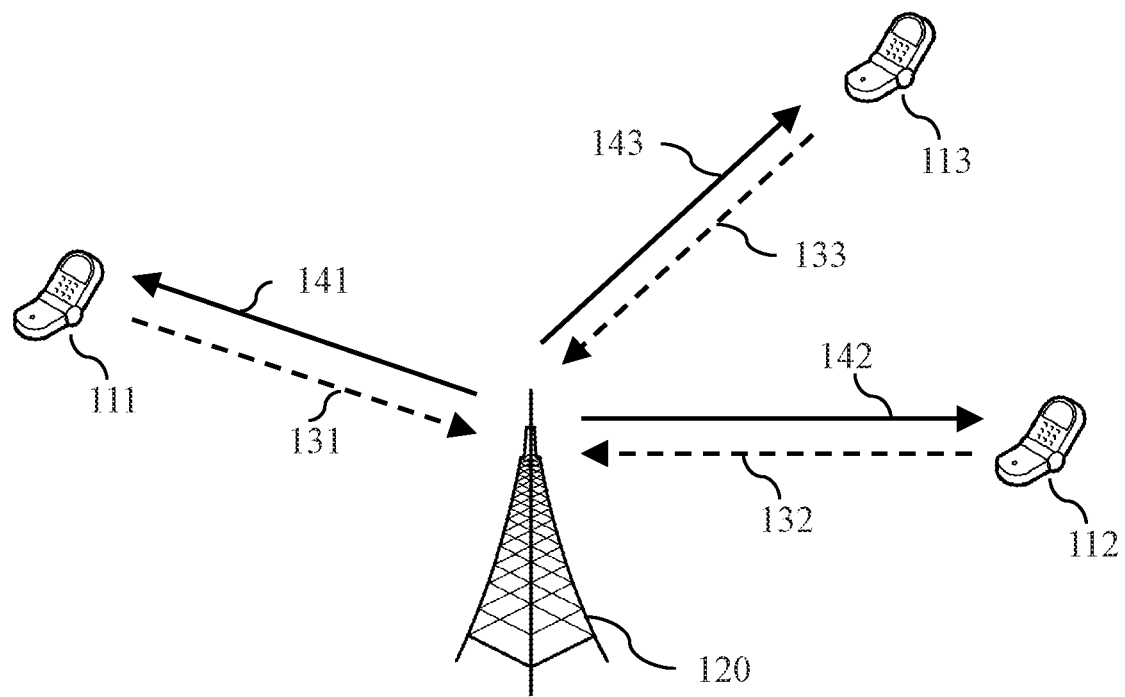
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G or New Radio (NR) cellular network) that includes a BS 120 and one or more user equipment (UE) 111, 112 and 113. In some embodiments, and as described above, the UE may transmit a random access signal including a CAZAC sequence (131, 132, 133), and subsequently receive a random access response (141, 142, 143) that was transmitted by the BS. The UE may be, for example, a smartphone, a tablet, a mobile computer, a machine to machine (M2M) device, a terminal, a mobile device, an Internet of Things (IoT) device, and so on.

Figure 2:
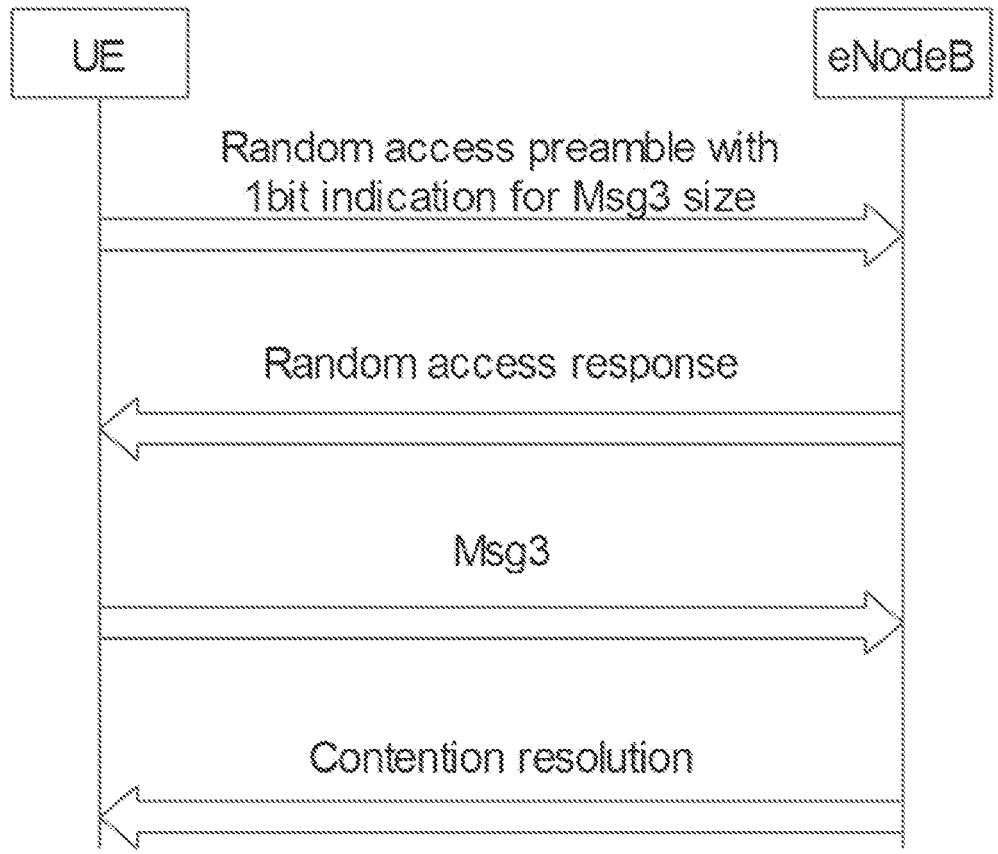
FIG. 2 shows an example of a random access procedure between a UE and a BS.

In some embodiments, and as shown in FIG. 2, the UE (or terminal, or mobile device) selects a preamble sequence from Group A or Group B to carry 1 bit of additional information, which is used to notify the base station of a size of a subsequent Msg3 sent by the UE. As shown in FIG. 2, after the random access signal Msg1, there is an uplink Msg3 to carry more data information to the base station to complete the entire random access procedure.

In these systems, it may be beneficial if the random access signal could carry more information, if the random access delay were shortened, and if the random access process were sped up. As shown in FIG. 2, a contention-based random access is completed in four steps. Embodiments of the disclosed technology speed up the random access process by combining the first step and the third step into one step, as well as the second step and the fourth step into one step, to construct a two-step random access, which can carry more additional information in the first step. Carrying additional information in the first step is also beneficial to Internet of Things (IoT) applications, since the amount of data uploaded by an IoT terminal is generally small. If this small amount of data could be transmitted through the additional information carried by the random access signal in the first step of random access, the IoT terminal can reduce power consumption, prolong battery life, and reduce network load. Furthermore, the embodiments described in the present document maintain backward compatibility; e.g., the sequence of random access signals is not modified and only the number of Msg1 transmissions are increased, and more random access sequence index groups are introduced to increase the information that can be carried.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Embodiments with an Increased Number of Msg1 Transmissions

In order to maintain backward compatibility with the NR system, a single UE may transmit multiple Msg1 within the framework allowed by the NR system. There are two ways to increase the number of times a single UE sends Msg1.

Method 1: By setting the ssb-perRACH-OccasionAndCB-PreamblesPerSSB parameter in ssb-perRACH-Occasion to less than 1 {e.g., ½, ¼, ⅛}, it may be ensured that an SSB can map to random access resources multiple times (e.g. multiple RACH occasions (ROs)). In general, UE is randomly selecting one of multiple ROs or selecting RO according to the PRACH mask index parameter. However, in the case where more information needs to be conveyed, the UE can choose all or part of the ROs associated with the SSB to send Msg1, to increase the number of Msg1 transmissions. This may be determined by the UE, e.g., whether to send a separate Msg1 as usual, or to send multiple Msg1 transmissions. The selection of the transmission does not affect the reception of the base station or network device, since either the existing situation (based on the PRACH mask index) results, or as described in the present document, the base station detects the multiple random access times that an SSB maps to. In either case, this does not increase the workload of the BS.

Method 2: The base station enables a multiple Msg1 transmission option, when the ssb-perRACH-Occasion in the ssb-perRACH-OccasionAndCB-PreamblesPerSSB parameter is greater than or equal to 1 {e.g., 1, 2, 4, 8, 16}. Then multiple ROs are used to send Msg1.

In some embodiments, Method 1 and Method 2 can be used at the same time. When ssb-perRACH-Occasion is less than 1, by enabling multiple Msg1 transmissions, more ROs than that of the Method 1 or Method 2 can be used to send Msg1.

Embodiments with Explicit Grouping and Multiple Msg1 Transmissions

In some embodiments, the indexes of the available preamble sequences are divided into group A and group B. When the UE selects group A, it represents the information bit 0, and when the UE selects group B, it represents the information bit 1, thereby conveying 1 bit of information. However, in multi-Msg1 transmissions or multi-RO transmissions, the same UE can use multiple RO with the preamble sequence index selected from group A, representing information bit 0, and from group B, representing the information bit 1. The preamble sequence index selected from groups A and B should be consistent to enable the base station to recognize multiple RO as being transmitted by the same UE.

For example, each RO can select a preamble sequence index from {0 ... 63}, which may be divided into group A including {0 ... 31} and group B including {32 ... 63}. If the UE wants to transmit the bit-sequence 01101100, it may choose 8 RO to transmit random access preamble sequence indexes as {1, 33, 33, 1, 33, 33, 1, 1}. However, if the preamble sequence index selected by the UE changes, e.g., {1, 33, 35, 2, 36, 37, 3, 4}, the base station cannot confirm that these are the multiple Msg1 transmissions sent by the same UE, and the information (e.g., bit-sequence 01101100) cannot be identified correctly.

In some embodiments, when the amount of information to be conveyed is small (e.g. two bits of information) and the random access preamble index of the two ROs is selected as {1, 33}, the base station may not be able to correctly ascertain that the received information is from the same UE in some scenarios. For example, there may be a missed detection, or the BS has, in fact, received Msg1 from two UEs. In these cases, a false alarm may occur. In existing implementations, the sizes of group A and group B (as currently defined in an implementation) are not necessarily the same, and thus, it is difficult to further constrain the selection of the preamble index to improve the detection rate and reduce the false alarm rate. Furthermore, explicit grouping combined with multiple Msg1 transmissions, when using existing group A and B definitions, overlays the original functionality which indicates the size of subsequent Msg3 and may not be sufficient to convey the size of the subsequent Msg3.

Embodiments with Implicit Grouping and Multiple Msg1 Transmissions

In some embodiments, and with implicit grouping, existing group A and group B definitions are not relied on. Instead, a mathematical relationship (or constraint) between the preamble sequence indexes selected for the ROs is defined to convey the information.

In an example, it may be assumed that 64 preamble sequences are available in one RO and are implicitly and evenly assigned to two groups on the UE side, e.g., low-order group {0 ... 31} and a high-order group {32 ... 63}, or one group with even indexes and another with odd indexes. This grouping does not require the base station or the network to configure explicit signaling indication or configuration to the UE, and does not require the UE or base station to report this grouping. The UE configures and uses this common predefined rule by itself, and thus, it is referred to as implicit grouping.

The UE implementing multiple Msg1 or multiple ROs transmissions may select a preamble sequence index from the low-order or even indexes group to represent the information bit 1, and may select an index from the high-order or odd indexes group to represent the information bit 0. In other embodiments, the rule may be swapped, but does not affect the efficacy of embodiments of the disclosed technology described herein.

Figure 3:
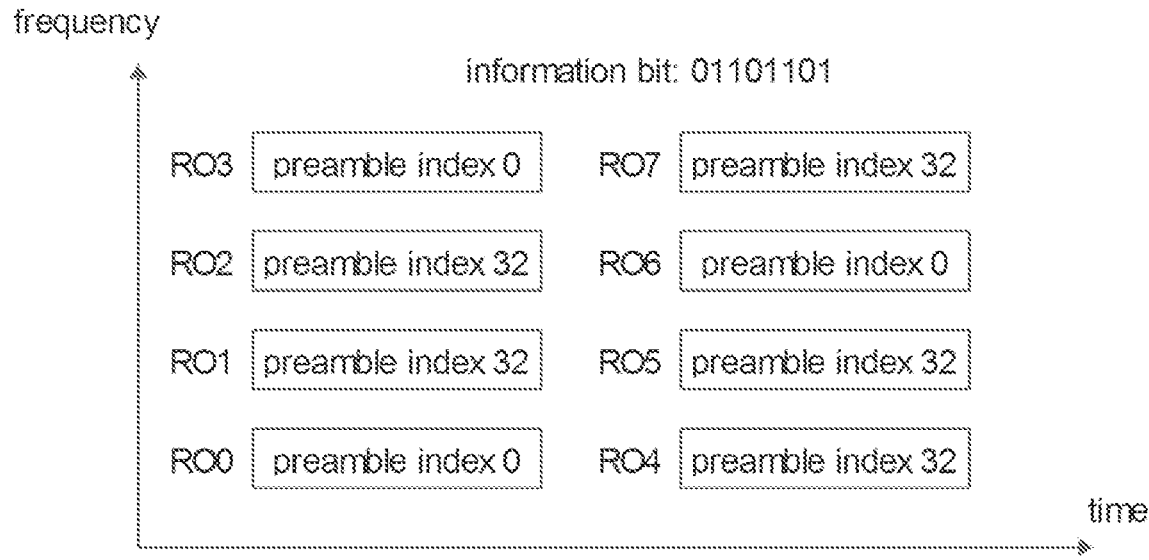
FIG. 3 shows an example of implicit grouping using multiple Msg1 transmissions, in accordance with some embodiments of the presently disclosed technology.

In addition to selecting the preamble sequence indexes from the respective groups, the selection must also satisfy a predetermined mathematical relationship (or constraint). For example, the difference between the indexes of the preamble sequence of the groups is fixed, e.g., the selection of {lower order group, high order group} may be {0, 32}, {1, 33} . . . , wherein the fixed difference is 32 (and as shown in FIG. 3). In another example, the selection of {even array, odd array} may be {0, 1}, {2, 3} . . . , wherein the fixed difference is 1. The constraint may also be {0, 64}, {1, 63} . . . selected by {low order group, high order group}, wherein the sum is 64 for all selections of the sequence indexes. Other constraints are equally applicable.

The purpose is to enable the base station to determine the sequence of the Msg1 satisfying the rule as the output of the same UE under the predefined rules, and distinguish the information content. Furthermore, the selection of the preamble sequence index on each RO should be consistent, which reduces false alarms and improves the detection rate.

It is to be noted that the groupings described in this embodiment are not related to the Group A and Group B groupings in existing implementations (which are normally used to convey the size of Msg3). Whether or not the system has enabled Group B, for example, does not affect the described methods and implementations. Similarly, if the system has configured Group A to contain 48 preambles and Group B to contain 16 preambles (e.g., in the case of contention-based random access (CBRA) preamble sequences), embodiments of the disclosed technology are still compatible within this framework.

The mathematical relationship (or constraint) defined between the preamble sequence indexes may be implemented in the case of contention-based random access (CBRA) that uses 56 preamble sequences or in the case of contention-free random access (CFRA) that uses 8 sequences. Thus, embodiments of the disclosed technology are compatible with both contention-based random access (e.g., CBRA) and contention-free random access (e.g., CFRA).

The ability to support multiple Msg1 transmissions is an enhanced capability, which may not be available to every terminal in a network. Thus, a system may include some UEs that support only basic functionality, and some UEs that could support the enhanced functionality. In these cases, the network needs to enable the foregoing predefined rules according to the scenario, and the terminal UE is notified in the high layer signaling or system information.

Embodiments with an Increased Number of Packets Used to Carry Information

The embodiments of the disclosed technology described above (e.g., based on explicit and implicit grouping) divide available preamble indexes into two groups. However, the embodiments described herein are equally applicable to cases when more information needs to be conveyed through the Msg1 transmissions. For example, the 64 available preamble sequence indexes may be divided into 4 groups, and the sequence indexes in the 4 groups respectively represent {00, 01, 10, 11}, which now conveys two bits of information instead of just one. And this may be further extended to partitioning into 8 groups to support 3 bits of information, etc.

Figure 4:
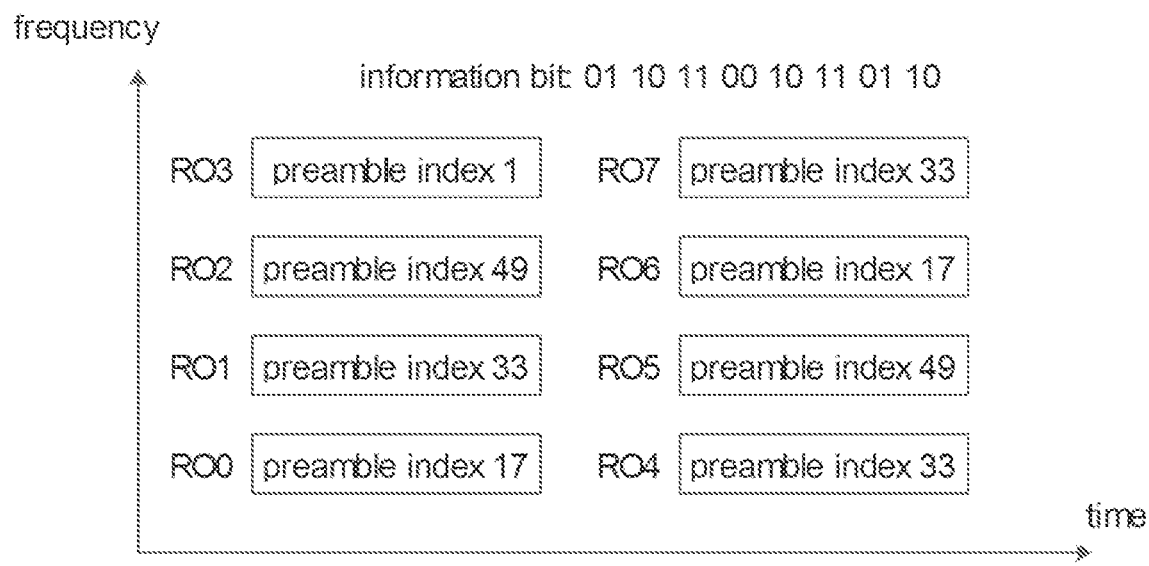
FIG. 4 shows another example of implicit grouping using multiple Msg1 transmissions, in accordance with some embodiments of the presently disclosed technology.

For example, and as shown in FIG. 4, the four groups of indexes may be {0 . . . 15}, {16 . . . 31}, {32 . . . 47}, {48 . . . 63}, a UE uses {1}, {17}, {33}, {49} to represent {00, 01, 10, 11} respectively, and the difference between the selected indexes is 49−33=33−17=17−1=16=64/4.

Effect of Multiple Msg1 Transmissions on Msg2

Embodiments of the disclosed technology, as described above, consider the use of multiple Msg1 or multiple ROs transmissions to carry additional information, the subsequent downlink signal random access response also needs to support this functionality. This may be achieved by the base station responding to the UE only after all the multiple Msg1 or multiple RO transmissions have been received. If the UE receives a response prior to having transmissions all the Msg1 that it was configured to, then it knows that the received response from the BS is incorrect, and assumes that the BS has not received all the Msg1 transmissions. The BS may correctly acknowledge having received all the multiple Msg1 or multiple RO transmissions in the following exemplary methods:

(1) The base station may insert all the received data in the multiple Msg1 transmissions into the random access preamble (RAP) identification (ID) (RAP ID) field of the random access response (RAR).

(2) The base station, after having received all the Msg1 transmissions, can correctly identify the UE, and may thus insert the UE identification (UE ID) into the random access response (RAR) to notify the UE that the multiple Msg1 transmissions were received and correctly decoded.

(3) The base station may scramble the control channel of the random access response (RAR) using the decoded information content. Thus, the UE descrambles the control channel using its own information which is embedded in the preamble indexes, and if it is successful, it determines that the multiple Msg1 transmissions were received and correctly decoded by the BS.

In some embodiments, the number of information bits being conveyed as well as the number of multiple Msg1 transmissions needs to be pre-defined and known by both the BS and the UE. This enables the BS to transmit the random access response as soon as the multiple Msg1 transmissions have been received. For example, using 8 Msg1 to transmit information, can transmit 8, 16, or more bits of information, the base station decoding 8, 16, or more bits of information, can determined that the first step of multiple Msg1 receiving has been completed. This is an implied trigger condition for aborting receiving.

In some embodiments, if the number of bits conveyed by the multiple Msg1 transmissions is determined by the UE only on the UE side but the base station is agnostic to this information, the base station needs to continuously monitor Msg1 transmissions, and ends the information decoding when an abnormal preamble is detected. It then attempts to transmit by using the previously obtained decoding information in a RAR to the UE. Such a scheme may bring a higher false alarm, but increases the flexibility of the UE to transmit varying bit lengths of information.

Exemplary Methods for the Disclosed Technology

Embodiments of the disclosed technology, as described in the various embodiments, advantageously enable the random access signal to carry more information, shorten the random access delay, and speed up the random access process.

Methods for the Network Node (or gNB, or Base Station)
(1) In some embodiments, and based on pre-defined configurations, the base station detects the random access preamble sequence index on multiple random access channel (RACH) occasions (ROs), and identifies the information that is hosted on multiple ROs. The random access preamble sequence index on multiple RO received is derived from the independent selection of the UE on multiple RO for each individual RO in an even number (e.g., 2, 4, 6 . . . ) of different preamble sequence indexes, wherein the even number of different preamble sequence indexes come from a set of preamble sequence indexes that are selectable on the RO.
(2) In some embodiments, the base station identifies information carried on the plurality of ROs by indexing between two or more even-numbered different preamble sequences, wherein the number of different preamble sequences is based on amount of information (e.g., 1-bit or more) that needs to be conveyed.
(3) In some embodiments, the base station can identify multiple ROs belong to the same UE, based on the continuous detection of the preamble sequence indexes selected from the two or more of the same number of different preamble sequence indexes and the detection of the relationship (or constraint) between the indexes.
(4) In some embodiments, the mathematical relationship (or constraint) may include:
  (i) The adjacent preamble sequence index is sorted from large to small, and the difference between adjacent preamble sequence indexes is fixed.
  (ii) The value of the index of the adjacent preamble sequence is fixed
  (iii) Two or more even-numbered different preamble indexes are derived from the grouping of indexes in the index set of the available preamble sequences; e.g., when there are two indexes, the two different preamble sequence indexes are from two different groups, or when there are four indexes, four different preamble indexes are from four different groups, etc., and there is no overlap between groups.
  (iv) Other similarly derived mathematical relationships (or constraints).
(5) In some embodiments, the system notifies the UE to enable multi-Msg1 bearer information by using a high layer signaling or a system message.
(6) In some embodiments, the base station uses the decoded information or part of the information content in the random access response, e.g. for control channel scrambling. In other embodiments, the base station is configured to insert all received multi-MSG1 preamble indexes or deformation of the preamble sequences in the random access preamble identification (RAPID) field of the random access response. In other embodiments, the base station inserts the received information into the random access response.

Methods for the Terminal (or Mobile Device, or UE)
(1) The UE sends multiple preamble sequences on multiple ROs; e.g., the UE independently selects one of two or more even-numbered different preamble sequences indexes for each individual RO and sent on the RO, wherein the two or more even-numbered different preamble sequence indices are derived from the set of preamble sequence indices available for selection on the RO.
(2) In some embodiments, the two or more of the different preamble sequence indexes and the mathematical relationship (or constraint) are pre-defined.
(3) In some embodiments, the mathematical relationship (or constraint) may include:
  (i) The adjacent preamble sequence index is sorted from large to small, and the difference between adjacent preamble sequence indexes is fixed.
  (ii) The value of the index of the adjacent preamble sequence is fixed
  (iii) Two or more even-numbered different preamble indexes are derived from the grouping of indexes in the index set of the available preamble sequences; e.g., when there are two indexes, the two different preamble sequence indexes are from two different groups, or when there are four indexes, four different preamble indexes are from four different groups, etc., and there is no overlap between groups.
  (iv) Other similarly derived mathematical relationships (or constraints).
(4) In some embodiments, the UE selects two or more even-numbered different preamble sequences based on the number of bits of information to be conveyed.
(5) In some embodiments, when the UE can support more Msg1 bearer information, multiple ROs may be selected to send Msg1 and bearer information.
(6) In some embodiments, and when the parameter ssb-perRACH-Occasion notified by the system is less than 1 or when the UE enables multiple Msg1 transmissions, multiple ROs may be selected to send Msg1.

FIG. 5 shows an example of a wireless communication method 500 for generating random access signals with bearing information. The method 500 includes, at step 510, transmitting, by a terminal to a network node, a first message comprising a first preamble sequence associated with a first index that is from a first half of a set of indexes.

The method 500 includes, at step 520, transmitting a second message comprising a second preamble sequence associated with a second index that is from a second half of the set of indexes, wherein the first index and the second index satisfy a constraint relationship.

In some embodiments, the terminal conveys a first value of an information bit by transmitting the first and second messages over a first resource and a second resource, respectively, and conveys a second value of the information bit by transmitting the first and second messages over the second resource and the first resource, respectively.

In some embodiments, the set of indexes may be partitioned into a greater number of groups (e.g., 4, 8, . . . ) in order to convey a greater number of bits, as described in the exemplary embodiments in the present document. For example, the set of indexes may be partitioned into four groups, which can be then used to convey two bits of information.

FIG. 6 shows another example of a wireless communication method 600 for generating random access signals with bearer information. This example includes some features and/or steps that are similar to those shown in FIG. 5, and described above. At least some of these features and/or components may not be separately described in this section.

The method 600 includes, at step 610, receiving, by a network node from a terminal, a first message comprising a first preamble sequence associated with a first index that is from a first half of a set of indexes.

The method 600 includes, at step 620, receiving a second message comprising a second preamble sequence associated with a second index that is from a second half of the set of indexes, wherein the first index and the second index satisfy a constraint relationship.

In some embodiments, the method 600 further includes the step of transmitting a random access response comprising the first index and the second index. This is one method of the network node (or base station, or gNB) verifying that all the multiple Msg1 or multiple RO transmissions have been received and correctly decoded.

In some embodiments, the method 600 further includes the steps of determining, based on the first index and the second index, an identification of the terminal, and transmitting a random access response comprising the identification of the terminal, which is another method of network node verification of multiple Msg1 receptions.

In some embodiments, the method 600 further includes the steps of transmitting, a random access response, and scrambling, based on at least a portion of the first index, a control channel associated with the random access response, which is yet another method of the UE knowing of multiple Msg1 successful receptions at the base station. In an example, the scrambling is further based on at least a portion of the second index.

In some embodiments, the both methods 500 and 600 may further include the step of refraining from communicating the constraint relationship. In other words, some embodiments are based on both the network node and the terminal having prior knowledge of the group partitioning and the mathematical relationship (or constraint).

In some embodiments, the constraint relationship comprises a sum of the first index and the second index being equal to a fixed value. In an example, the first half of the set of indexes comprises $\{0, 1, \ldots, 2^{N-1}-1\}$, wherein the second half of the set of indexes comprises $\{2^{N-1}, 2^{N-1}+1, \ldots 2^N-1\}$, where the fixed value is $2^N-1$, N is a positive integer, the first index is j and the second index is $2^N-1-j$, and $0 \leq j < 2^{N-1}$ is an integer.

In some embodiments, the constraint relationship comprises a difference between the first index and the second index being equal to a fixed value. In an example, the first half of the set of indexes comprises $\{0, 1, \ldots, 2^{N-1}-1\}$, wherein the second half of the set of indexes comprises $\{2^{N-1}, 2^{N-1}+1, 2^N-1\}$, wherein the fixed value is $2^{N-1}$, N is a positive integer, the first index is $2^{N-1}+j$ and the second index is j, and $0 \leq j < 2^{N-1}$ is an integer. In another example, the first half of the set of indexes comprises $\{0, 2, 4, 6, 8, \ldots, 2^N-2\}$, wherein the second half of the set of indexes comprises $\{1, 3, 5, 7, \ldots, 2^N-1\}$, wherein the fixed value is 1, N is a positive integer, wherein the first index is j+1 and the second index is j, and $0 \leq j \leq 2^N-2$ is an integer.

Implementations for the Disclosed Technology

Figure 7:
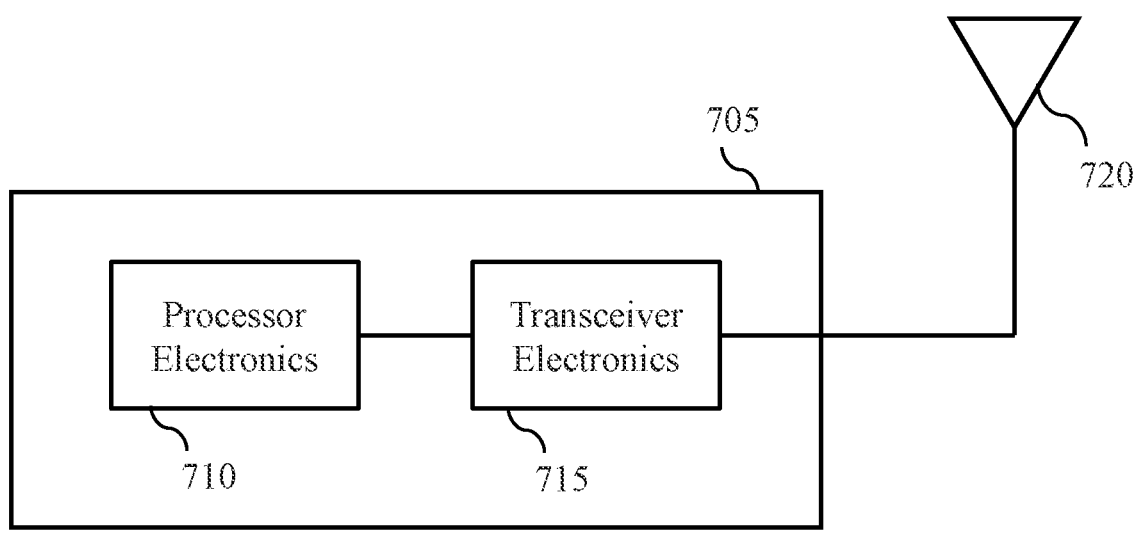
FIG. 7 is a block diagram representation of a portion of an apparatus, in accordance with some embodiments of the presently disclosed technology.

FIG. 7 is a block diagram representation of a portion of an apparatus, in accordance with some embodiments of the presently disclosed technology. An apparatus 705, such as a base station or a wireless device (or UE), can include processor electronics 710 such as a microprocessor that implements one or more of the techniques presented in this document. The apparatus 705 can include transceiver electronics 715 to send and/or receive wireless signals over one or more communication interfaces such as antenna(s) 720. The apparatus 705 can include other communication interfaces for transmitting and receiving data. Apparatus 705 can include one or more memories (not explicitly shown) configured to store information such as data and/or instructions. In some implementations, the processor electronics 710 can include at least a portion of the transceiver electronics 715. In some embodiments, at least some of the disclosed techniques, modules or functions are implemented using the apparatus 705.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
   determining, by a user equipment (UE), at least one random access channel occasion (RO) associated with a synchronization signal block (SSB);
   transmitting, by the UE to a network node, a first message multiple times with the at least one RO, wherein the first message comprises a first preamble sequence associated with a first index;
   transmitting, by the UE to the network node, a second message comprising a second preamble sequence associated with a second index; and
   receiving, by the UE from the network node, a random access response comprising the first index and the second index.

2. The method according to claim 1, wherein:
   the first message is a first random access signal.

3. The method according to claim 1, wherein the determining the at least one random RO associated with the SSB comprises:
   randomly selecting one RO from a plurality of ROs.

4. The method according to claim 1, wherein the determining the at least one random RO associated with the SSB comprises:
   determining the at least one RO according to a parameter of a physical random access channel (PRACH) mask index.

5. The method according to claim 1, wherein the determining the at least one random RO associated with the SSB comprises:
   selecting all ROs associated with the SSB.

6. The method according to claim 1, wherein the transmitting the first message multiple times comprises:
   transmitting the first message multiple times with the determined RO.

7. The method according to claim 1, wherein the transmitting the first message multiple times comprises:
   transmitting the first message multiple times with all ROs associated with the SSB.

8. The method according to claim 1, further comprising:
   in response to a parameter in SSB-RO related signaling being less than one, mapping the SSB to multiple ROs.

9. The method according to claim 8, wherein:
   the SSB-RO related signaling comprises a ssb-perRACH-Occasion.

10. The method according to claim 1, wherein:
    the first index is from a first half of a set of indexes,
    the second index is from a second half of the set of indexes, and
    the first index and the second index satisfy a constraint relationship.

11. The method according to claim 10, further comprising:
    refraining from communicating the constraint relationship.

12. The method according to claim 10, wherein the constraint relationship comprises a sum of the first index and the second index being equal to a fixed value.

13. The method according to claim 12, wherein:
    the first half of the set of indexes comprises $\{0, 1, \ldots, 2^{N-1}-1\}$, wherein the second half of the set of indexes comprises $\{2^{N-1}, 2^{N-1}+1, \ldots, 2^{N}-1\}$, wherein the fixed value is $2^{N}-1$, and wherein N is a positive integer.

14. The method according to claim 1, wherein:
    the UE conveys a first value of an information bit by transmitting the first and second messages over a first resource and a second resource, respectively, and conveys a second value of the information bit by transmitting the first and second messages over the second resource and the first resource, respectively.

15. The method according to claim 10, wherein:
    the constraint relationship comprises a difference between the first index and the second index being equal to a fixed value.

16. The method according to claim 15, wherein:
    the first half of the set of indexes comprises $\{0, 2, 4, 6, 8, \ldots, 2^{N}-2\}$, wherein the second half of the set of indexes comprises $\{1, 3, 5, 7, \ldots, 2^{N}-1\}$, wherein the fixed value is 1, and wherein N is a positive integer.

17. The method according to claim 16, wherein:
    the first index is j+1 and the second index is j, and wherein $0 \leq j \leq 2^{N}-2$ is an integer.

18. A wireless communications apparatus comprising a processor and a memory, wherein the processor is configured to read code from the memory and perform:
    determining at least one random access channel occasion (RO) associated with a synchronization signal block (SSB);
    transmitting, to a network node, a first message multiple times with the at least one RO, wherein the first message comprises a first preamble sequence associated with a first index;
    transmitting, to the network node, a second message comprising a second preamble sequence associated with a second index; and
    receiving, from the network node, a random access response comprising the first index and the second index.

19. A non-transitory computer-readable medium storing code, wherein the code, when executed by a processor, causing the processor to perform:
    determining at least one random access channel occasion (RO) associated with a synchronization signal block (SSB);
    transmitting, to a network node, a first message multiple times with the at least one RO, wherein the first message comprises a first preamble sequence associated with a first index;
    transmitting, to the network node, a second message comprising a second preamble sequence associated with a second index; and
    receiving, from the network node, a random access response comprising the first index and the second index.

* * * * *